United States Patent [19]

Kosikowski et al.

[11] Patent Number: 4,689,151
[45] Date of Patent: Aug. 25, 1987

[54] METHOD FOR REMOVAL OF PHARMACEUTICAL ANTIBIOTICS FROM CONTAMINATED MILKS

[75] Inventors: Frank V. Kosikowski, Ithaca, N.Y.; Rafael Jimenez-Flores, Davis, Calif.

[73] Assignee: Cornell Research Foundation, Inc., Ithaca, N.Y.

[21] Appl. No.: 736,323

[22] Filed: May 21, 1985

[51] Int. Cl.[4] ............................................. B01D 13/00
[52] U.S. Cl. ..................................... 210/641; 210/651
[58] Field of Search ..................... 210/641, 651, 433.2; 426/491

[56] References Cited

U.S. PATENT DOCUMENTS 4,091,116  5/1978  Edwards et al. ............... 426/491 X
4,497,836  2/1985  Marquardt et al. ............ 426/491 X

OTHER PUBLICATIONS

Porter, et al., "Membrane Ultrafiltration", from Chem. Tech., Jan., 1972 (pp. 56-61).

Primary Examiner—Frank Spear
Attorney, Agent, or Firm—Ralph R. Barnard

[57] ABSTRACT

A method of removing penicillin G and/or pharmaceutical antibiotics which contaminated milk by:
(a) Subjecting the contaminated milk to an ultrafiltration process which produces a permeate containing the contaminating antibiotic and a retentate comprising milk proteins and fats.
(b) Adding a non-antibiotic containing retentate diluting (washing) aqueous fluid including uncontaminated ultrafiltered milk permeate, uncontaminated whole milk, uncontaminated skimmilk, or uncontaminated acid or sweet whey, or a mixture thereof to the retentate to dilute the retentate.
(c) Subjecting the diluted (washed) retentate to the ultrafiltration process from additional antibiotic containing permeate thereby forming a milk product comprising retentate having a reduced level of or substantially free of antibiotics.
(d) After the last dilution (wash) step and the milk retentate is returned to selected protein concentration the retentate is reconstituted with either uncontaminated ultrafiltrated milk permeate, or uncontaminated whole milk, or uncontaminated skimmilk, or acid whey or sweet whey.

8 Claims, 5 Drawing Figures

METHOD FOR REMOVAL OF PHARMACEUTICAL ANTIBIOTICS FROM CONTAMINATED MILKS

The present invention relates to the method of removing antibiotics from contaminated milk and more particularly to the method of removing the antibiotics by passing the contaminated milk through an ultrafiltration membrane wherein the antibiotic products are small enough to pass through the membrane as a part of the permeate, (which also includes water, soluble food components, sugars, salts, and non-protein nitrogen. The larger soluble components of milk along with fats, proteins, insoluble salts, bacteria and enzymes, are retained in the retentate of the ultrafiltration equipment.

Residual pharmaceutical antibiotic have been found in milk since early national and regional surveys showed an incidence of 7 to 15%.

Reference is made to the following publications:
1. Kosikowski, F. V. and Mocquot, G. 1958. "Advances in Cheese Technology" Food and Agriculture Organization (UN). Rome, Italy pp. 236;
2. O'Reilly, P. F. 1972. "A Survey of the Incidence of Antibiotic Contamination of Milk in the Dublin Liquid Milk Area" Irish Vet. J. 26:41;
3. Overby, A. J. "Antibiotics in Milk" 1954. A Review. Dairy Sci. Abstract, 16:2;
4. Storrs, F. C. and Hiet-Brown, W. 1954. "The Incidence of Penicillin in Milk Supplies" J. Dairy Research 21:337.

The increased testing for antibiotics and the enforcement of regulations regarding their entry into milk have not irradicated the problem. One reason has been the higher sensitivity of new or improved assays to detect trace penicillin and other antibiotics in milk. The *Bacillus stearothermophilus* assy, now official in New York and other states, can detect approximately 0.002 IU penicillin per ml milk.

Public health officials are concerned that even small amounts of antibiotics, particularly penicillin, ingested by the human through the food chain are potentially dangerous. This is primarily because their presence may permit loss of antibiotic sensitivity in pathogenic or food poisoning bacteria such as staphylococci with subsequent ineffectiveness of medical treatment where antibiotics are proscribed.

Economic losses to the milk producer, handler and processor can be high because, in addition to legal penalties, present methods for salvaging contaminated milks function poorly and may simply transfer the antibiotic residue into other dairy products. It was reported recently that milk was being rejected by handlers because antibiotics were present and that load losses were very great.

Disposal may be undertaken by selling to veal companies for distress prices, dumping onto open fields where permitted or by centrifuging out the fat component. Penicillinase, an enzyme specific for penicillin, effectively negates the bacteriostatic action of penicillin, but leaves the altered penicillin molecule in milk while introducing another additive, the enzyme, whose effect on human health is unknown. Reference is made to two articles; number 1 referred to above; and an article entitled "Experiments with Penicllinase for the Inactivation of Pennicillin" by T. Storgards, T. and Anderson, L., Proceed. 13th Inter. Dairy Congress 3:1188-1192. For this reason the use of penicillinase in this country and elsewhere is illegal.

S. E. Charm recently patented a method to remove beta lactam antibiotics such as penicillin G from milk by its passage through an activated charcoal column with adsorption of the antibiotic (U.S. Pat. No. 4,328,521, Dec. 9, 1980). The concept is patterned after a known practice by pharmaceutical companies to remove impurities in commercial antibiotic production. Later Charm reported that the U.S. Food and Drug Administration has raised questions about his process concerned with microbiology and the physical properties of fat. Reference is made to an article by S. E. Charm entitled "Advances in the rapid detection of B-lactan Antibiotics and Their Removal from Milk" Proceed. 2nd biennial Marschall International Cheese Conference, Madison, Wisc., Sept. 15-17, p. 56).

In the dairy industry large scale ultrafiltration of milk and whey at low temperatures is becoming a common practice. Ultrafiltration with polysufone membranes of molecular weight size from 10,000 to 20,000 daltons and higher retain fat, protein, insoluble salts, bacteria, viruses and enzymes. Antibiotics can permeate molecular membranes, a characteristic employed by the pharmaceutical industry to separate and harvest large concentrations of antibiotics from liquid substrate. However, separation of trace antibiotics from milk by ultrafiltration and its effectiveness have not been shown prior to the present invention.

One of the teachings of the present invention is the provision of a method to remove penicillin G and other pharmaceutical antibiotics to non-detectable levels in contaminated whole milks by a combination of ultrafiltration separations and permeate washes to fully recover fat and milk-solids-non-fat in an unaltered state. An essential discovery underlying this method is that residual antibiotics are not strongly bound to the milk protein.

BRIEF DESCRIPTION OF THE FIGURES

Upper plate (PI) represents, 1-control raw milk, 2-same milk contaminated with 0.05 IU penicillin/ml, 3-UF retentate without wash (dilution), 4-retentate after first permeate wash (dilution) and reultrafiltration, 5-UF retentate after second permeate wash (dilution) and reultrafiltraiton.

Lower Plate (PII) represents same as above but after retentates were reconstituted to original whole milk volume with fresh, penicillin-free permeate.

Upper Plate (PIII) represents, 1-control raw milk, 2-same milk contaminated with 0.10 pencillin/ml, 3-UF retentate without wash (dilution), 4-UF retentate after first permeate wash (dilution) and reultrafiltration, 5-UF retentate after second permeate wash (dilution) and reultrafiltration and 6-UF retentate after third permeate wash (dilution) and reultrafiltration.

Lower Plate (PIV) represents same as above but after retentates were reconstituted to original whole milk volume with penicillin-free permeate.

Upper plate (PV) represents 1-control raw milk, 2-same milk contaminated with 0.20 penicillin/ml, 3-UF retentate without wash dilution), 4-UF retentate first permeate wash and reultrafiltration, 5-UF retentate after second after permeate wash (dilution) and reultrafiltration and 6-UF retentate after third permeate wash (dilution) and reultrafiltration.

Lower Plate (PVI) represents same as above but after retentates were reconstituted to original whole milk volume with penicillin-free permeate.

DESCRIPTION OF THE INVENTION

The teachings of the present invention provide a new and improved method of removing penicillin G and/or pharmaceutical antibiotics which contaminated milk by:
(a) Subjecting the contaminated milk to an ultrafiltration process which produces a permeate containing the contamining antibiotic and a retentate comprising milk proteins and fats.
(b) Adding a non-antibiotic containing retentate diluting (washing) aqueous fluid including uncontaminated ultrafiltered milk permeate, uncontaminated whole milk, uncontaminated skimmilk, or uncontaminated acid or sweet whey, or a mixture thereof to the retentate to dilute the retentate.
(c) Subjecting the diluted (washed) retentate to the ultrafiltration process from additional antibiotic containing permeate thereby forming a milk product comprising retentate having a reduced level of or substantially free of antibiotics.
(d) After the last dilution (wash) step and the milk retentate is returned to selected protein concentration the retentate is reconstituted with either uncontaminated ultrafiltrated milk permeate, or uncontaminated whole milk, or uncontaminated skimmilk, or acid whey or sweet whey.

As used herein, the words dilution and wash have the same meaning. Moreover, the aqueous liquids which are used in the dilution and reconstitution step are intended to be clean and uncontaminated even though for brevity these adjectives may not be used herein.

Figure 4A:
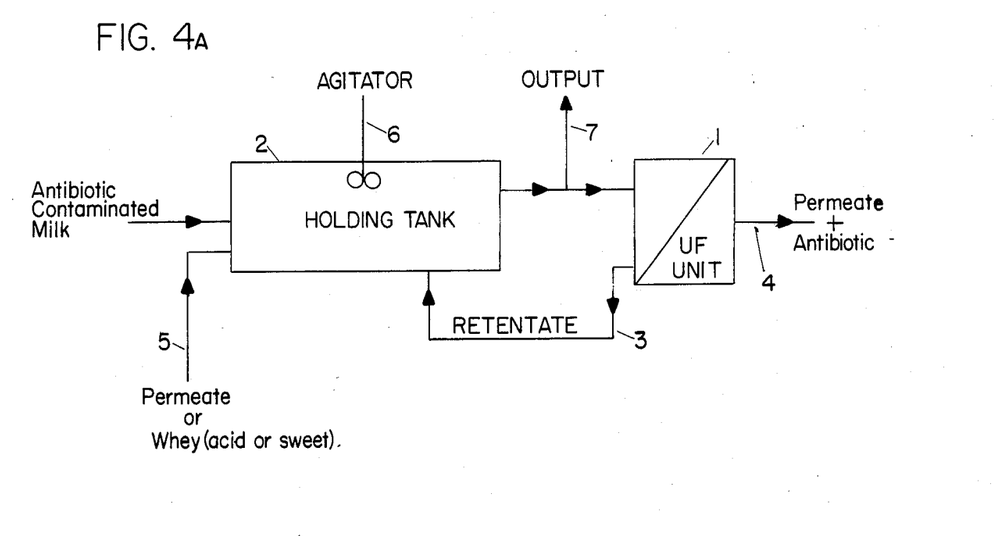
FIG. 4A discloses the equipment in block diagram form which is usable to practice the new and improved method of the present invention.

Referring now to FIG. 4A, Block 1 is an ultrafiltration unit of sanitary design of the type now available in the United States, France and Denmark and presently used for cheese and other food manufacture. Chapter 5 of a book entitled "Membrane Filtration: A User's Guide and Reference Manual" authored by Thomas D. Brock and published by Science Tech, Inc., Madison, Wis. (1983), lists various manufacturers of ultrafiltration equipment. The ultrafiltration equipment used to make the present invention was an Abcor 225 unit with HFM membranes of 20,000 daltons manufactured by Abcor, Inc., 850 Main Street, Wilmington, Mass. 01877. In handling large volumes of milk, membrane-type need not be changed in pore size, but the volume handling capabilities of the equipment (membrane surface area and fluid pressure) may well be adjusted as appropriate. The milk product going into the ultrafiltration unit is cycled therethrought at a selected temperature across a membrane comprising cellulose acetate with polyvinyl chlorine backing, or polysulfone, or other acceptable member material in a forced turbulent flow. The temperature used depends upon the desired concentration of proteins and fat in the output. When milk contaminated with antibiotics is passed through this ultrafiltration membrane means, the soluble components of milk of sizes less than approximately 20,000 daltons, including the antibiotics associated therewith, can pass through the membrane as permeate and the larger molecular size components and fats are concentrated in the retentate output. The typical temperature range for the milk to subject to ultrafiltration is 52°–54° C. While the pore size of the membrane used was 20,000 daltons, the pore size may be altered to another value as long as it corresponds to a molecular size compatible with ultrafiltration of milk. Ultrafiltration of milk as used herein means the passing of the contaminated milk through an ultrafiltration membrane wherein the antibiotic products are small enough to pass through the membrane as a part of the permeate (which also includes water, soluble food components, sugars, salts and non-protein nitrogen). The larger components of milk along with fats, proteins, insoluble salts, bacteria and enzymes, are retained in the retentate of the ultrafiltration equipment. For example, a pore size of 50,000 daltons has been successfully used to remove penicillin G through ultrafiltration in accordance with the present invention. The membranes of the ultrafiltration equipment may take several forms, plates, tubes, hollow fiber or spiral wound, and are mounted for support on stainless steel stands.

Figure 4B:
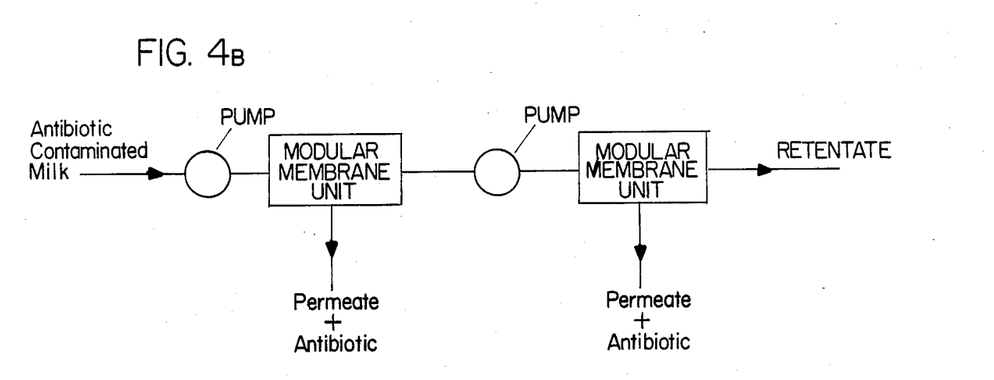
FIG. 4B disclosed a straight line modular configuration for placing a plurality of pumps and modular membrane units in the ultrafiltration unit shown in FIG. 4A.

Referring again to FIG. 4A, the contaminated milk to be processed in accordance with this invention is in a holding tank 2 with the output of the tank being connected to pass the milk to the ultrafiltration unit 1. The contaminated milk is repetitively passed across to the membrane under pressure and back to the holding tank 2 as retentate over retentate line 3. Permeate including antibiotics pass out exit 4 of the ultrafiltration unit 1. Ultrafiltration unit 1 may contain any number of separate and modular membrane sub-units in series or in parallel receiving the milk to be ultrafiltered and each sub-unit may be fed by a separate pump. With plural membrane sub-units in the ultrafiltration unit 1, it is possible to separate out as a part of the permeate antibiotics in the milk to reduce the level of antibiotics such that only one pass through ultrafiltration unit 1 is required. For example, FIG. 4B shows a series arrangement of plural modular membrane sub-units with a pump associated with each which might be included within ultrafiltration unit 1 of FIG. 4A. A requirement of passing the milk through the ultrafiltration unit 1 a plurality of times in order to reduce the level of antibiotics in the retentate is characterized as a batch process. Passing the milk through the ultrafiltration unit 1 but once when the number of membranes therein is sufficient to reduce the antibiotic level in one pass through the ultrafiltration unit is called continuous processing. In unit 1 the contaminated milk is repetitively passed through to be ultrafilterated, the retentate volume in the holding tank 2 becomes more concentrated and includes all of the larger molecular sizes of the components of milk (the proteins) and fats, and the greater amount of the unwanted antibiotics are removed via exit 4 as part of the permeate. This process is continued until a selected concentration of retentate is reached (ratio of retained volume as retentate of the initial volume of milk in the holding tank 2). If the initial level of unwanted antibiotic is low, the repetitive ultrafiltration can be stopped after the first wash and utilized as a concentrate or the washed retentate in the tank is returned to the original or partial volume of the starting milk by adding via input (means 5) any of the following: non-detectable antibiotic clean permeate (from another ultrafiltration operation), whey (acid or sweet), clean whole milk or clean skimmilk, resulting in a reconstituted milk product with a contaminating antibiotic level below that which can be detected. The standard measurement of the antibiotic level of the fluid milk in the holding tank would be made at the beginning, at the finish and during the process as required. The holding tank may require the use of an agitator 6 to facilitate the process, particularly in the final reconstituting phase, and the reconstituted milk would be taken from the holding tank 2 via exit 7.

In some instances there will be times when the concentration step for the starting milk in the holding tank by repetitively passing the milk through the ultrafiltration unit 1 and washing (dilution) will not be sufficient to reduce the level of antibiotics in the retentate so that when the retentate is reconstituted as a milk product, the level is below the minimum acceptable standards. In such an event, a key teaching of the present invention is that instead of reconstituting the retentate after the maximum or optimum concentration of the starting milk is reached in the retentate, permeate, or fluid whey is added in the same fashion in a selected amount which would dilute the retentate to a selected level such as, for example, to return the retentate in holding tank 2 to its original volume.

As the addition of permeate returns the volume of the holding tank 2 to the starting volume, the agitator 6 mixes the permeate throughly with the retentate. Thereafter, the fluid of the holding tank 2 is repetitively passed through the ultrafiltration unit 1 with the retentate being passed back into the holding tank via pipe 3 as shown. The concentration step is repeated to the selected level of concentration by volume. Additional antibiotics are passed out of the untrafiltration unit 1 in the permeate. This use of permeate or fluid whey for reconstituting and reconcentration is identified as washing, a washing step, or a washing (dilution) cycle. The washing step or washing cycle can be repeated as many times as required in order to reduce the level of antibiotics in the milk (retentate) in the holding tank, but generally it may be only once. After the washing cycles have given the retentate a very low or no measurable level of antibiotics, as measured, the retentate is ready to be reconstituted by the addition to the holding tank of any of the following: clean permeate, clean whey (acid or sweet), clean whole milk or clean skimmilk. The agitation makes the milk product content of the holding tank uniform, and the end milk product can be put to any use consistent with the type of liquid used in the final concentration in the holding tank 2, or there need be no reconstitution and the retentate which is now non-detectable for antibiotics may be used for any dairy or food use.

Initially, approximately 115 l. lots of freshly drawn mixed raw milk were obtained from the 56 cow Holstein herd at the Cornell Veterinary Farm on the campus. To a number of these fresh milk lots were added, approximately, 0.05, 0.10 and 0.20 IU penicillin G per ml.

The penicillin G contaminated milks were then ultrafiltered at 54° C. to ⅓ of their original volume (3:1) in an Abcor 22S unit using a spiral-wound polysolfone membrane of 4.65 m2 with a molecular weight cut-off of 20,000 daltons. Inlet and outlet pressure were 340 and 140 kPA.

The resulting 3:1 retentate from each lot was washed by adding an equal volume of fresh, uncontaminated UF milk permeate by stirring the two components for 1 min. Thereafter the mixture was ultrafiltered again to 3:1 volume concentration. The washing and re-ultrafiltering step was repeated for each lot up to four times depending upon initial penicillin G level. Alternatively, for comparison on separate lots clean tap water was the washing medium with sweet whey used as the reconstituting medium at the end of the process.

Milks, retentates and permeates were analyzed for the presence and size (diameter) of inhibiting zone presence using the Difco disk assay involving Bacto-PM indicator agar and thermospores of *Bacillus stearothermophilus*. Gross composition of milk and retentates were obtained by using AOAC methods. Sensory evaluation of retentates and reconstituted retentates was conducted by the authors using a graduated scale of 10 to 0, indicating excellent to non-acceptable qualities, and listing defects outlined in the official ADSA milk scorecard.

Penicillin removal by direct ultrafiltration of 3 trial lots of raw whole milks were obtained purposedly in the winter period on the same day. These were contaminated with penicillin G, at approximately 0.05, 0.10 and other ultrafiltration trials on contaminated milk conducted several weeks apart with permeate washes (data not shown) gave similar results. Criterion for determining efficiency of removal was the presence or absence of a zone of bacterial inhibition and the diameter measurement of zone. Initial cottonized test discs before being wetted with milk and placed on agar surfaces were 13 mm.

Table 1. shows milk contaminated to approximately 0.05 IU/ml penicillin G, prior to ultrafiltration gave a 24 mm diameter zone including the original disc.

TABLE 1

Disc zone size of Penicillin contaminated raw milk[1] retentates and reconstituted milks after ultrafiltration and permeate wash-out using *B. stearothermophilus* assay[2].

| Permeate wash treatment of retentates | Penicillin contamination - IU/ml milk | | |
|---|---|---|---|
| | .05 | .10 | .20 |
| | Zone Diameter - mm [Retentate Concentrated 3:1] | | |
| No wash | 24 | 27 | 27 |
| After 1st wash | 21.5 | 23 | 25 |
| After 2nd wash | 18 | 19 | 22 |
| After 3rd wash | no zone | 15 | 20.5 |
| After 4th wash | — | — | 14.5 |
| | [Retentate Reconstituted 3-fold with Permeate] | | |
| No wash | 20 | 21 | 24 |
| After 1st wash | no zone | 15 | 17 |
| After 2nd wash | no zone | no zone | 16 |
| After 3rd wash | no zone | no zone | 15 |
| After 4th wash | — | — | no zone |

Figure 1:
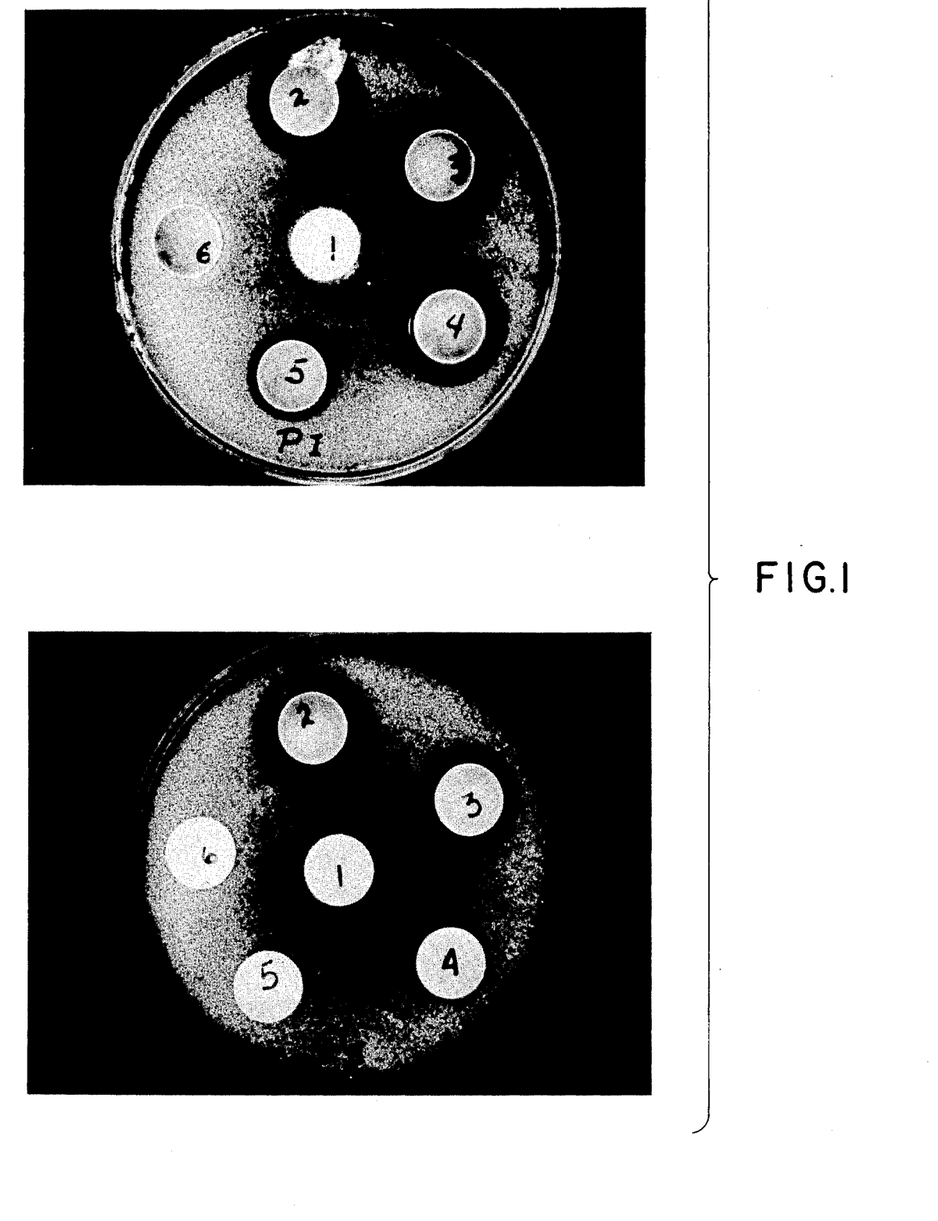
FIG. 1 is an ultrafiltration (UF) wash (dilution) removal of penicillin G from raw whole milk purposedly contaminated to 0.05 IU/ml. Retentate concentrated 3:1.

[1]Raw milk = no zone; contaminated raw milk = 23.5, 28 and 34 mm.
[2]New York State interprets non-detectable milk as absence of zones or diameters up to 15.9 mm. Assay disc before use = 13 mm.
— = no assay Before addition of penicillin this milk showed no zone. Ultrafiltering the antibiotic-positive milk to 3:1 volume concentration effectively removed penicillin G with succeeding washes Table 1, FIG. 1. After removing 80 l of permeate from 120 l of contaminated milk by UF of the zone diameter of the unwashed retentate was 24 mm. Washing this retentate 1:1 with 40 l of permeate and reultrafiltering to remove 40 l contaminated permeate reduced the zone diameter to 22 mm. Following a second 1:1 wash and re-ultrafiltration the zone diameter was 18 mm. and a third wash gave a retentate without any zone. Reconstituting the three separately washed and reultrafiltered retentates to their original milk volume with fresh uncontaminated permeate produced whole milks either without any inhibiting zones or so small as to be classified as non-detectable by New York State standards.

Figure 2:
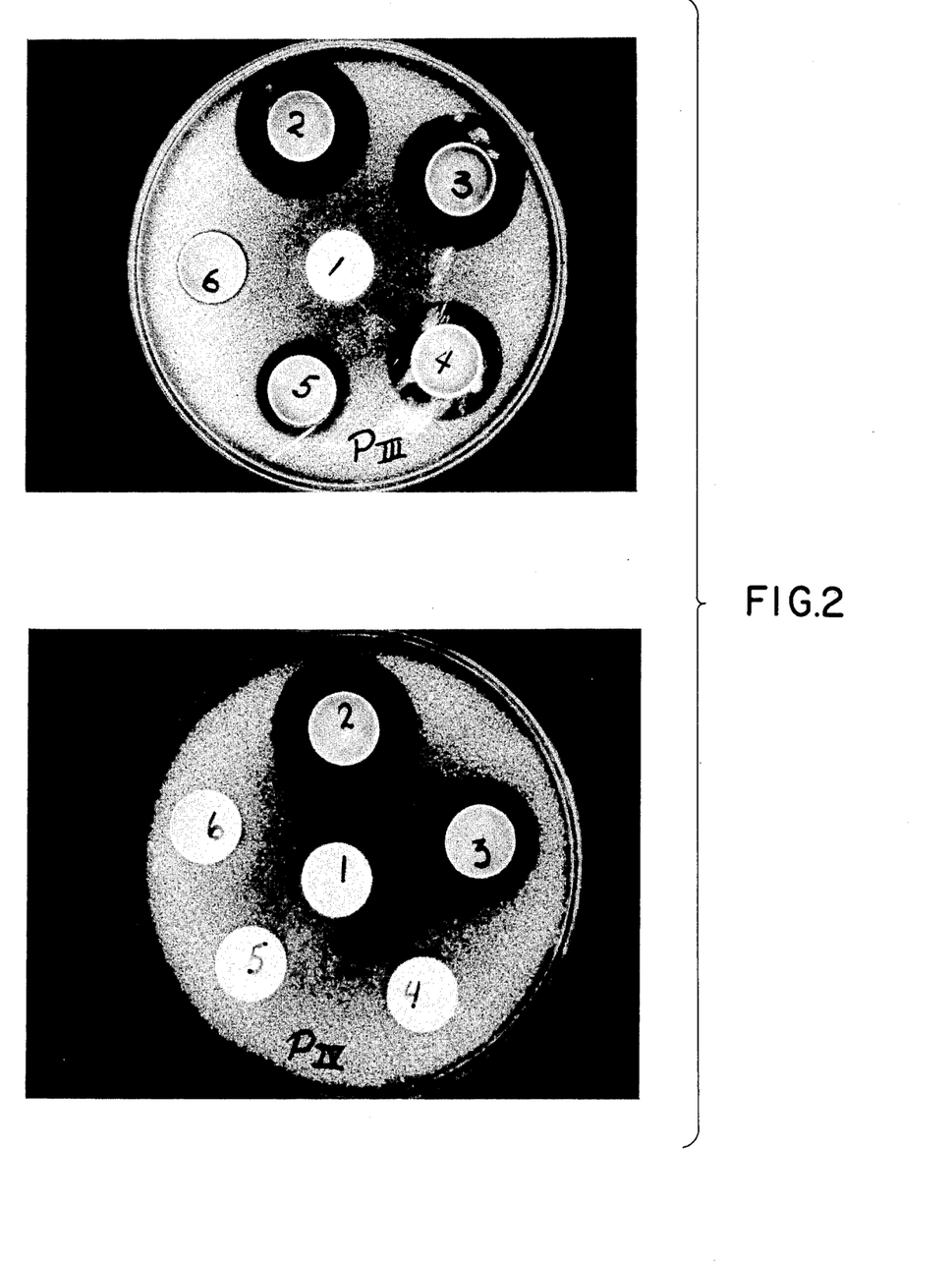
FIG. 2 is an ultrafiltration (UF) wash removal of penicillian G from raw whole milk purposedly contaminated 0.01 IU penicillin/ml. Retentate concentrated 3:1.
Figure 3:
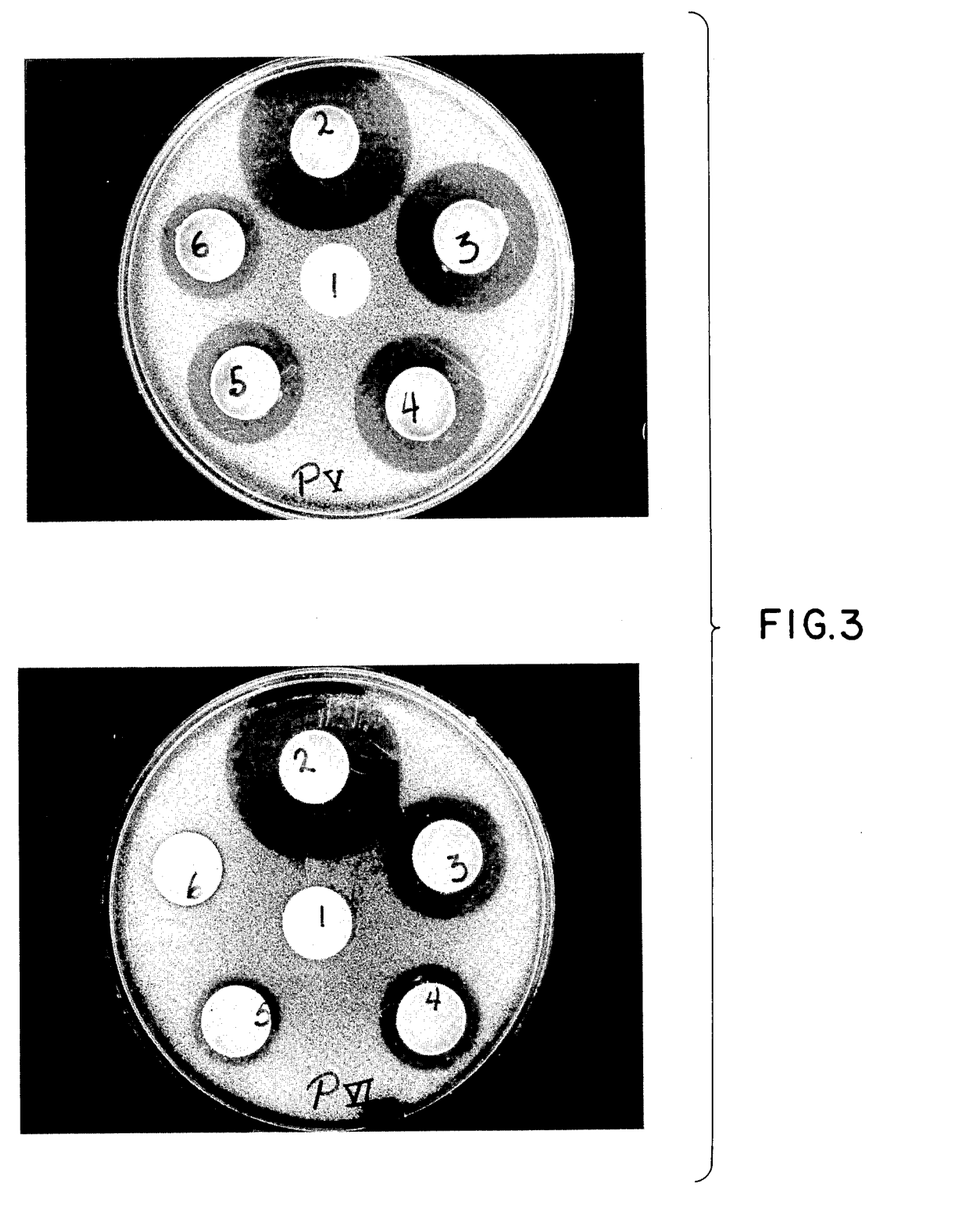
FIG. 3 is an ultrafiltration (UF) wash removal of penicillin G from raw whole milks purposedly contaminated with 0.20 IU penicillin/ml. Retentate concentrated 3:1.

Milk purposedly contaminated with 0.1 IU penicillin/ml displayed an initial zone of 28 mm and that contaminated with 0.2 IU/ml of zone of 34 mm, Table 1. Ultrafiltration followed by three permeate washings and reultrafiltrations eliminated the zone developed by non-wash retentate from the 0.10 IU/ml milk lot and reduced it to below the New York non-detectable levels (<15.9 mm) after three and four washings and reultrafiltrations in a similar retentate from 0.20 IU/ml milk. When retentates from 0.10 IU penicillin/ml contaminated milk were reconstituted with uncontaminated permeates, resulting whole milks were classified non-detectable for penicillin after only one wash. Table 1, FIG. 2. In milks purposedly contaminated to approximately 0.20 IU/ml penicillin G, an almost non-detectable penicillin situation (16 mm) occurred after the second wash, Table 1, FIG. 3.

The penicillin-contaminated 3:1 retentate and the same penicillin-free retentate after three permeate washes and reultrafiltrations display only minor differences in composition, Table 2.

TABLE 2

Composition of pencillin contaminated milks and 3:1 retentate and penicillin-free 3:1 retentate after 3 washes with permeate.

| HISTORY | T.S. | FAT % | PROTEIN % | ASH | LACTOSE |
|---|---|---|---|---|---|
| Whole Milk | 12.0 | 3.5 | 3.3 | 0.7 | 4.5 |
| 3:1 Retentate | 23.9 | 9.9 | 9.5 | 1.0 | 3.5 |
| 3:1 Retentate Washed 3x With Permeate | 24.0 | 9.9 | 9.5 | 0.9 | 3.8 |

Four lots of raw whole milk purposedly contaminated to approximately 0.10 IU pennicillin/ml intially gave a mean inhibitory zone diameter of 27.4 mm. All lots were ultrafiltered then washed with clean tap water and reultrafiltered. Reconstitution of the unwashed retentates to the original volume of raw whole milk were made using sweet whey.

Table 3 shows mean inhibitory zone diameter reduction.

TABLE 3

Disc zone size of .10 IU penicillin/ml contaminated raw milk[1] retentates and reconstituted retentates after ultrafiltration and water washes using *B. stearothermophilus* Assay[2].

| Water wash treatment of retentate | Trials | Penicillin G contamination-.10 IU/ml milk Mean Zone Diameter - mm |
|---|---|---|
| [Retentate concentrated 3:1] | | |
| No wash | 4 | 28.2 (1.4) |
| After 1st wash | 4 | 24.9 (1.4) |
| After 2nd wash | 4 | 21.6 (1.4) |
| After 3rd wash | 4 | 16.4 (2.5) |
| [Retentate reconstituted 3-fold with sweet whey] | | |
| No wash | 4 | 22.1 (0.63) |

TABLE 3-continued

Disc zone size of .10 IU penicillin/ml contaminated raw milk[1] retentates and reconstituted retentates after ultrafiltration and water washes using *B. stearothermophilus* Assay[2].

| Water wash treatment of retentate | Trials | Penicillin G contamination-.10 IU/ml milk Mean Zone Diameter - mm |
|---|---|---|
| After 1st wash | 4 | 15.0 (0.58) |
| After 2nd wash | 4 | no zone |
| After 3rd wash | 4 | no zone |

[1]Raw milk = no zone; contaminated raw milk = 27.4 (0.48)
[2]New York State interprets non-detectable milk as absence of zone or diameter up to 15.9 mm. Assay disc before use = 13 mm. diameter.

After three water washings the mean zone diameter of the washed retentate was 16.4 mm. Reconstituted milk mixtures from the first washed retentate were non-detectable (15 mm) for penicillin G, while reconstituted mixtures from the second and third washed retentates showed no zones.

Composition of 3:1 whole milk retentates after three washings with tap water, differed from starting unwashed retentates, Table 4. Also whey reconstituted (3:1) washed retentate showed a different composition from the original whole milk, Table 4.

TABLE 4

Composition of .10 IU penicillin/ml contaminated milk, unwashed 3:1 UF retentate and penicillin-free 3:1 retentate after 3 washings with water

| HISTORY | T.S. | FAT % | PROTEIN % | ASH | LACTOSE |
|---|---|---|---|---|---|
| Whole Milk | 12.2 | 3.8 | 3.5 | 0.7 | 4.2 |
| 3:1 Retentate | 28.0 | 10.4 | 10.5 | 1.1 | 6.0 |
| 3:1 Retentate Washed 3x With Water | 22.0 | 10.0 | 10.1 | 0.3 | 1.6 |
| 1 Part 3x washed Retentate plus 2 parts sweet whey | 11.7 | 3.5 | 3.9 | 0.6 | 3.7 |

PENICILLIN G IN PERMEATES

Large inhibiting zone diameters as high as 34 mm were observed on agar surface when testing permeates obtained from ultrafiltering penicillin contaminated milk. Levels of penicillin in permeate decreased after each washing indicating that this avenue was mainly responsible for the effective removal of traces amount of penicillin G from contaminated milk.

FLAVOR OF ULTRAFILTERED-WASHED RECONSTITUTED MILKS

Penicillin contaminated milks ultrafiltered and then washed with permeate gave retentate and permeate reconstituted milks of excellent flavor quality, Table 5 making it virtually impossible to differentiate between reconstituted and fresh whole milks. Contaminated milks ultrafiltered and then washed with water followed by reconstitution with fresh permeate possessed a clean but flat flavor as did their retentates.

ANTIBIOTICS OTHER THAN B-LACTAM GROUP

Six antibiotics, including a number outside the B-lactan group were tested for their sensitivity to *B. steareothermophilus* disc assay in anticipation ofstudying their removal behavior in milk. All exhibited sensitivity to the assay but 5 demonstrated less sensitivity than a blend of pencillin G and novobiocin. While the additional antibiotics outside the B-lactan group are progressively removed from the starting milk as a part of the permeate during the utrafiltration step, the lack of sensitivity of the state of the art assay does affect the certainity with which it may be determined, that these additional antibiotics have been removed to a selected level. As measuring techniques improve for the presence of these additional antibiotics in milk, the precision with which the teachings of the present invention can be used to remove these antibotics. These antibiotics, like penicillin G are not strongly bound to the milk protein.

Contamination of milk and milk products by pharmaceutical antibiotics as residues from dairy cow mastitis treatment still occurs nationally. A USDA national antibiotic study showed that among 2265 skimmilk powers almost 3% were contaminated. See an article entitled "Surveillance of Milk Products for Penicillin", as done by The Dairy Division of The USDA *Department of Agriculture Journal of Milk Technology* 38 (No. 10) 621–23. Antibiotic residues have been reported in a silo containing 136,000 l. milk.

Much research has dealt with developing antibiotic detection methods and organizing control or prevention programs. Little activity has been directed to totally removing pharmaceutical antibiotics from contaminated milk. Removal attempts have been focused on dilution or on centrifugation of components but neither has been effective and both induce physical alteration of the milk product or its components.

It is stated in U.S. Pat. No. 4,238,521 that adsorption of penicillin G from milk on charcoal columns additionally removes milk nutrients and that it is also necessary to centrifuge out activated charcoal fine particulates accumulating in the milk from the treatment.

Removal of penicillin G to non-detectable levels from milk by ultrafiltration, washing permeate, and re-ultrafiltering followed by reconstitution with fresh permeate leads to no loss of milk components, nutrients, or flavor nor is there any accumulation of extraneous material. In the absence of fresh antibiotic-free permeate as wash material whey can be substituted to remove penicillin G from milk but the washed retentates will not possess the same composition as the unwashed and would be limited to supplementing foods or cheesemilks.

Penicillin G, a beta lactam, was the antibiotic studied here but in the treatment of cattle afflicted with mastitis, perhaps 20–30% or more of the antibiotics used, in combination with penicillin or alone, are not beta-lactams. These include oxytetacycleine, erythromycin, ampicillin and novobiocin. All display less sensitivity then penicillin G to inhibition by test assay organism B, stearothermophilus. Any removal process for pharmaceutical antibiotics should endeavor to remove the above. However, all these antibiotics meet two basic requirements for effective separation by ultrafiltration: high solubility and low molecular weight.

The highest penicillin concentrations in milk treated by ultrafiltration in the present study was approximately 0.2 IU/ml which required four washings of retentation to achieve non-detectable status. In New York State, and perhaps others, it is rare for milks legally condemned for containing antibiotics to exceed a 25 mm inhibition zone and the usual range is 19-mm. Experience indicates then that removal of pharmaceutical antibiotics from a milk showing approximately 24 mm zones (0.05 IU/ml) could be accomplished by one wash of the retentate. At even lower penicillin levels it is likely that a smaller volume of permeate is required. Ultrafiltering antibiotic contaminated milk to total protein levels higher than 3:1 may fit well with operations at cheese plants utilizing the MMV precheese concept of Maubois et al. French Pat. No. 2,052.121.

Antibiotic removal from milk with less loss of milk may be applicable at the farm of the future equipped to ultrafilter milk on the premises. The milk producer might segregate his mastitis-treated cows at the end of the milking line and ultrafiltrate-wash-reultrafiltrate milk only from cows after 48 hours of treatment using permeate for wash from ultrafiltered milk of untreated cows. The antibiotic-free retentate then might be added to the main body of the retentate in the bulk tank. (LCR) cheesemaking up to 2:1 volume concentrate the opportunity for disruption It is understood that the embodiments of the invention described herein are merely illustrative of the application of the principles of the invention. Reference herein to details of the illustrated emobdiments is not intended to limit the scope of the claims which themselves recite those features regarded as essential to the invention.

I claim:

1. A method of removing trace amounts of residual penicillin G or other residual pharmaceutical antibiotics which have contaminated milk comprising:
   (a) subjecting the said contaminated milk having trace amounts of residual penicillin G or other residual pharmaceutical antibiotics to an ultrafiltration process which produces a permeate containing the contamining antibiotic and a retentate comprising milk proteins and fats;
   (b) adding a non-antibiotic containing aqueous fluid including uncontaminated ultrafiltered milk permeates, uncontaminated whole milk, uncontaminated skimmilk, or uncontaminated acid or sweet whey, or a mixture thereof to the retentate to dilute the retentate;
   (c) subjecting the diluted retentate to the ultrafiltration process to form additional antibiotic containing permeate thereby forming a milk product comprising retentate having a reduced level of or substantially free of antibiotics.
   (d) the said dilution cycle being repeated until the level of antibiotics in the milk retentate is reduced to a non-detectable level.

2. The method of claim 1 wherein the milk retentate output of ultrafiltration is placed in a holding tank which also receives the diluting aqueous fluid and which provides the diluted milk retentate for further separation in the ultrafiltration process.

3. The method of claim 2 wherein after the last dilution step the milk retentate is returned to selected protein concentration by reconstituting with either uncontaminated ultrafiltrated milk permeate, or uncontaminated whole milk, or uncontaminated skim milk, or uncontaminated acid whey or sweet whey.

4. The method of claim 2 wherein the holding tank is the tank of the truck or milk silo which collected or carries or holds the contaminated milk.

5. The method of claim 1 wherein other pharmaceutical antibiotics are those which:
   (a) may be effectively separated by ultrafiltration;
   (b) have high solubility in water (c) possess low moledular weights consistent with milk ultrafiltration and the membrane used therefore;

(d) may be measured in milk with reasonable sensitivity.

6. A method of removing trace amounts of residual penicillin G or other residual pharmaceutical antibiotics which have contaminated milk comprising the following steps:

(a) passing the said contaminated milk having trace amounts of residual penicillin G or other residual pharmaceutical antibiotics into a holding container of a selected size;

(b) repetitively passing said milk in the said holding container through an ultrafiltration membrane means whereby soluble components of milk of molecular sizes compatible with ultrafiltration including the antibiotic associated therewith pass through the membrane in permeate and the larger molecular sized components and fats are connected as retentate until a selected concentration is reached;

(c) diluting and washing a selected volume of resulting milk retentate by adding a selected volume of uncontaminated ultrafiltration milk permeate or fluid whey and repetitively passing through said ultrafiltration membrane means until the milk retentate is returned to a related protein concentration;

(d) the said washing cycle being repeated until the level of antibiotics in the milk retentate is reduced to a non-detectable level.

7. The method of claim 6 wherein after the last dilution step and the milk retentate is returned to selected protein concentration the retentate is reconstituted with either uncontaminated ultrafiltrated milk permeate, or uncontaminated whole milk, or uncontaminated skimmilk, or acid whey or sweet whey.

8. The method of claim 6 wherein the holding container is the tank of the truck or milk silo which collected or carries or holds the contaminated milk.

* * * * *